United States Patent [19]

Rando

[11] Patent Number: 5,584,458
[45] Date of Patent: Dec. 17, 1996

[54] QUICK-ACTION MOUNT FOR SELF-LEVELING LASER

[75] Inventor: Joseph F. Rando, Los Altos Hills, Calif.

[73] Assignee: Levelite Technology, Inc., Mountain View, Calif.

[21] Appl. No.: 503,893

[22] Filed: Jul. 18, 1995

[51] Int. Cl.⁶ ................................................. A47B 96/00
[52] U.S. Cl. ................................ 248/231.41; 248/206.5; 248/229.22; 269/166; 269/169
[58] Field of Search ............................ 248/231.41, 220.1, 248/222.14, 229.1, 229.12, 229.22, 226.11, 228.3, 300, 316.4, 206.5, 309.4, 683; 269/166, 168, 169

[56] References Cited

U.S. PATENT DOCUMENTS

| | | | |
|---|---|---|---|
| 4,926,722 | 5/1990 | Sorensen et al. | 269/166 X |
| 5,009,134 | 4/1991 | Sorensen et al. | 269/166 X |
| 5,022,137 | 6/1991 | Sorensen et al. | 29/559 |

*Primary Examiner*—Ramon O. Ramirez
*Attorney, Agent, or Firm*—Thomas M. Freiburger

[57] ABSTRACT

A quick action bar clamp has provision for mounting an alignment laser instrument on one jaw of the clamp. The mounting provision allows manual pointing of the laser to facilitate projecting a level line or plane of light with a self-leveling laser instrument. By engagement of the clamp on a fixed structure such as a column, wall stud or door frame, the operator can quickly bring the laser instrument into its self-leveling range and easily adjust the beam height. The attachment of the laser instrument to the clamp is via a threaded rod or a magnetic attachment retention. An L-shaped magnetic attachment can be used in another procedure, to connect the laser to the steel slide bar of the clamp.

12 Claims, 5 Drawing Sheets

QUICK-ACTION MOUNT FOR SELF-LEVELING LASER

BACKGROUND OF THE INVENTION

This invention relates to mounting hardware for a self-leveling laser instrument. These instruments are used extensively in the construction industry to project lines and planes of light for building references. The invention allows the user to quickly and efficiently mount the laser instrument in a wide variety of conditions.

On a construction site a worker normally must carry his layout tools around the building site for each job. It is, therefore, advantageous and beneficial to have a small, compact measurement tool to do measurement jobs normally done using a tripod, transit, and a grade rod. In the prior art, the laser instrument has often been mounted on a tripod with an elevating column. The disadvantage of this method is that the tripod is large and clumsy to carry as well as being expensive. The elevating column is required to adjust the height of the laser instrument to position the laser beam at the needed elevation. Using the present invention, the number, weight and volume of accessories required to use a laser instrument is minimized saving the user cost and storage space. The invention makes the best use of available materials at the building site. The invention allows a self-leveling laser instrument to be mounted on virtually any structure already on the building site through the use of a flexible clamp and attached rotating turntable. Such structures include half-built walls, batter boards, ladders and many other items, whether permanently fixed or temporarily in a stable position.

SUMMARY OF THE INVENTION

The first component of the layout tool mounting device of the invention is a clamp with a pistol grip. This clamp may be that manufactured by the American Tool Company, described in U.S. Pat. Nos. 5,022,137 and 4,926,722. A clamp jaw is modified by adding a second component, a rotatable turntable, to which a self-leveling laser instrument is mounted, such as the instrument described in my copending application Ser. No. 248,517, now U.S. Pat. No. 5,459,932. The turntable provision allows the projected laser beam to be pointed anywhere in the level plane without changing its elevation. The attachment to the turntable is via a threaded rod or a magnet on a rod. The use of a magnet facilitates the quick fastening and unfastening as is required in setting up the laser instrument for one job and another in quick succession without having to take time to screw the parts together. Using a pistol grip of the clamp device, the operator is able to mount the laser instrument on walls, window frames, building studs, batter boards, or numerous other objects on the construction site.

As is known with the referenced clamps, the pistol grip of the clamp allows the operator to clamp onto objects with one hand. Tension in the clamp is controlled by the applied squeeze in the grip. The operator's second hand can be used to finely position the clamp to the elevation as required. When the position has been reached, the clamp is tightened to secure the mount assembly in place. The typical laser instrument used with the invention is provided with a threaded hole for convenient mounting. A ¼-20 thread is often used for this purpose to accommodate conventional tripods. A threaded rod on a manually rotatable turntable is screwed into the laser instrument to provide attachment.

The laser instrument for primary use with the subject invention typically has a self-leveling range of plus or minus three to five degrees or more in any direction. When clamped on a vertical member, the adjustment for rough level in one axis is automatic, since the clamping jaws are vertical at their engaging faces. Rough leveling in the direction perpendicular to the jaws of the clamping member can be done by slightly loosening the clamp and moving the pistol grip up or down to rotate the clamp about a horizontal axis. When the laser instrument appears to be vertical, it is certain to be within a few degrees of level; the operator then tightens the pistol grip locking the instrument in place. Because the rotatable turntable is on an approximately vertical axis, the self-leveling laser instrument may now be rotated about its axis creating a horizontal reference plane.

The turntable assembly allows mounting on either of two opposed sides which gives the clamp greater flexibility in positioning the laser instrument relative to the vertical clamping surface. For example, when a room door frame is clamped, one clamp jaw is in the room and one is outside the room. Since only one jaw of the clamp has the turntable assembly, the clamp must be turned around to place the turntable in the needed position. This flexibility in mounting is possible since the laser instrument can be mounted on either side of the turntable, and either side of the turntable can be used as a knob to rotate the turntable to the desired direction.

To achieve the objectives of smooth wobble-free rotation as well as cost-effective manufacture, the threaded rod which fastens to the laser instrument is used as an adjustment mechanism. The spacing between the two turntable platforms, or turntables, needs to be adjusted so as to provide sufficient friction to sustain the laser instrument in the direction pointed. On the other hand, the friction must not be so great that the operator has difficulty in directing the laser instrument. The same threaded rod which fastens to the laser instrument securely connects to the two turntables. The spacing is controlled by screwing the two turntables toward or away from each other. Their final position is maintained by a thread locking compound.

In an alternate method of fastening the laser instrument to the turntable, only the center section of the rod is threaded. A small magnet is fastened at each end of the rod to hold the instrument in place. The steel threaded insert within the laser instrument is attracted by the magnet with sufficient strength to secure the laser instrument to the turntable.

In an alternate embodiment of the invention, a fixed mounting platform is included instead of the rotating turntable. In this case a self-leveling rotating laser or a self-leveling plane generating laser instrument can mounted on a jaw of the clamp, without the need for a rotating mount. Such laser instruments must be leveled to within the self-leveling range of the instrument. The benefits of easy height adjustment and rough leveling provided by the clamp make this application attractive.

It is among the important objects of the invention to provide a simple and efficiently used clamping tool and method for use of a self-leveling laser instrument for layout work, such as at a construction site. The clamp device and method enable an operator to very quickly set up a laser mounting platform tool within the self-leveling range of the instrument, as well as providing an easy means and procedure of height adjustment. The invention eliminates the need for a tripod and provides a far more versatile mounting procedure than available with a tripod. These and other objects, advantages and features of the invention will be apparent from the following description of a preferred embodiment, considered along with the accompanying drawings.

DESCRIPTION OF PREFERRED EMBODIMENTS

Figure 1:
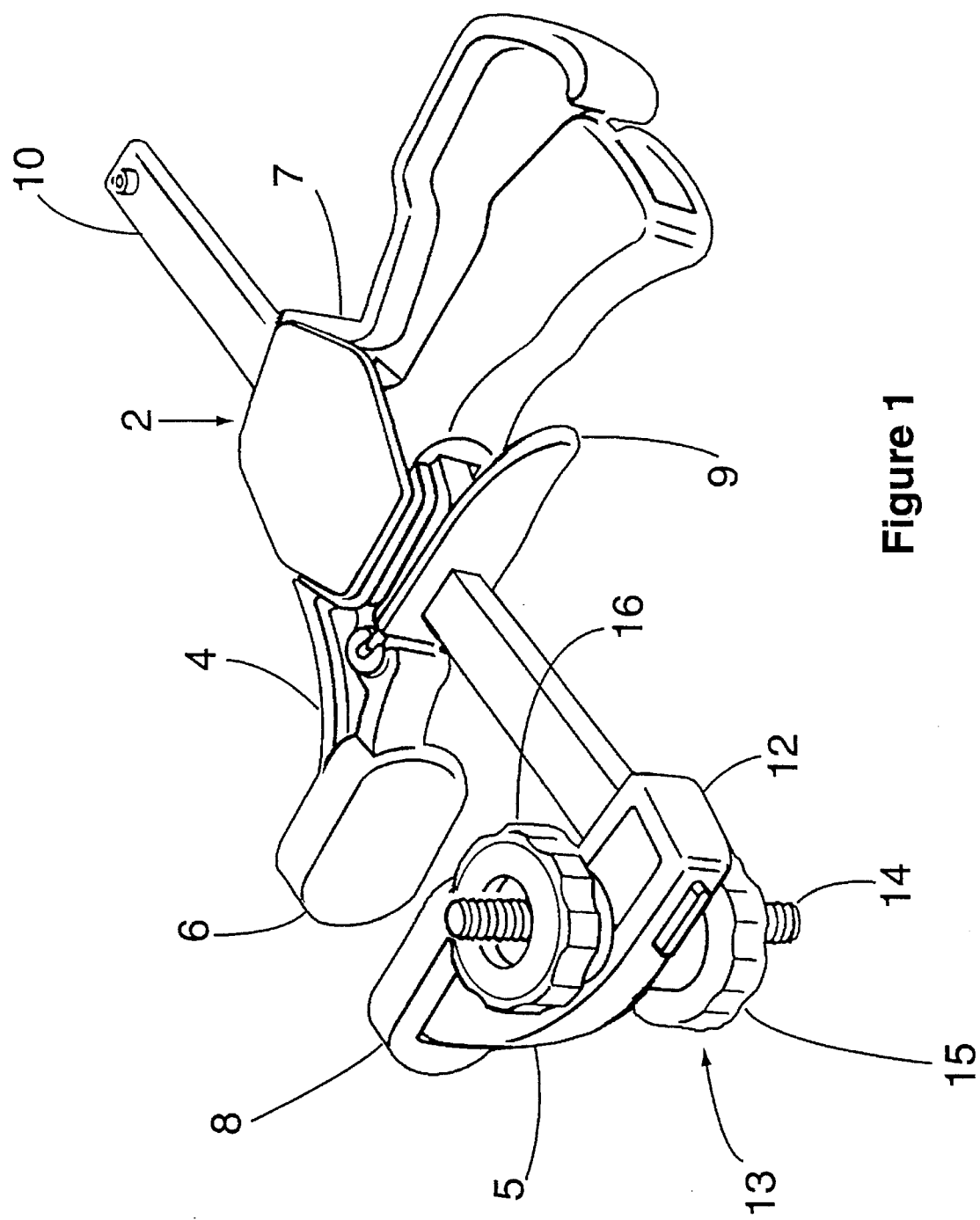
FIG. 1 is a perspective view showing a quick-action mounting clamp of the invention.

The clamp device of the invention is generally indicated at 2 in FIG. 1. In its most common application, the jaws 4 and 5 of the device clamp a vertical surface such as a column or door frame, generally in the orientation shown in FIG. 1. A pistol grip 7 which is fixed to the jaw 4, including the known one way drive with a release lever 9, advances with the jaw 4 on a steel slide bar 10. The fixed jaw 5 and movable jaw 4 of the clamp have rubber pad covers 6 and 8 to grip rough surfaces. Plastic rotating turntables 12 and 16 of a turntable assembly 13 each have a smooth flat surface 15 to form the interface between a laser instrument 17 (FIGS. 2 and 3) and the turntable. A threaded rod 14 extends on a vertical axis in this clamp position, passing through the jaws and both turntables. The two plastic turntables rotate together (as explained below) so that the operator can easily screw the threaded rod into the laser instrument by rotating the turntable.

Figure 2:
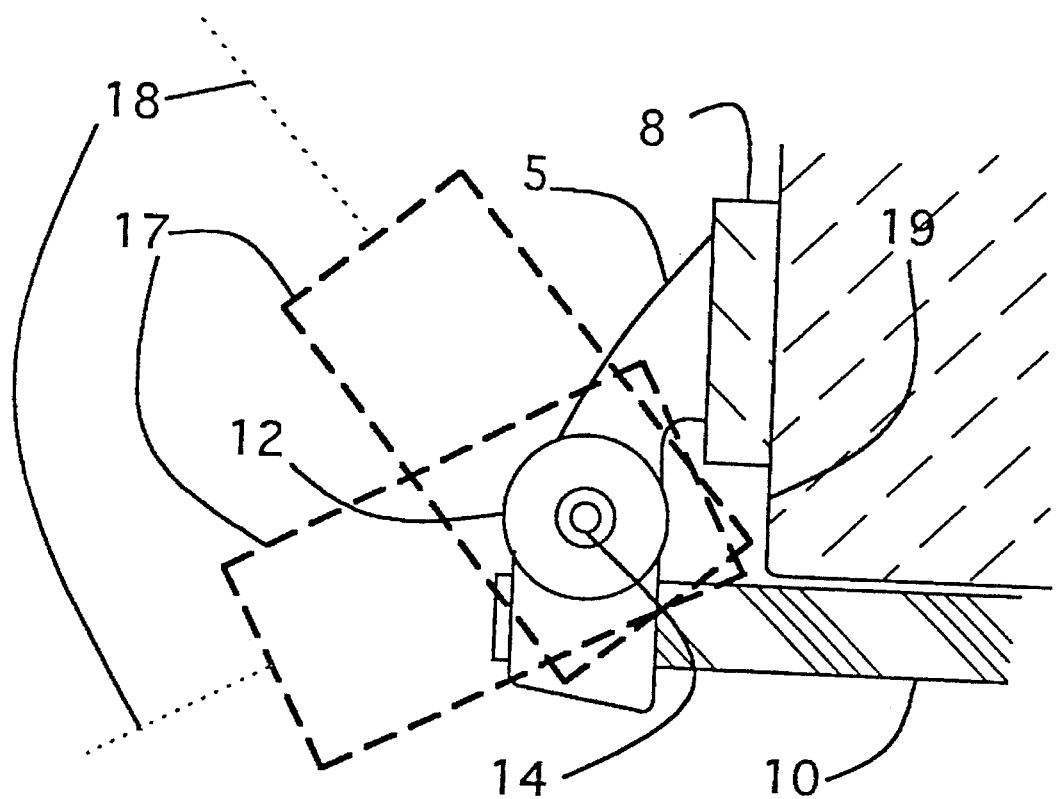
FIG. 2 is a somewhat schematic top view showing the clamp device engaged on a structure and indicating a laser instrument outlined in two different positions of rotation, projecting a beam in two directions.

A top view of the invention is shown in FIG. 2. Dotted lines indicate two positions of the self-leveling laser instrument 17. The smaller dotted lines at 18 represent the projected laser beams from the two positions. As can be envisioned from this view, the laser beams can scan approximately 270 degrees in a preferred embodiment. Modifications can be made to the jaw 5 and turntable assembly to extend out the axis of the rod 14 so as to provide full 360° rotation, if desired. A portion of an object to which the invention is clamped is indicated at 19. The jaw 5 supports the turntable 12 as well as the rubber cover pad 8 (the other clamp jaw 4 and the pistol grip 7 are not seen in FIG. 2). The threaded mounting rod is seen at 14 and the steel bar is at 10. If the structure 19 were a door frame to a room, the laser beam could not scan the portion of the room obstructed by the door frame 19. Because of the symmetry of the turntable 12, the clamp device can be turned upside down and remounted at the other side of the door frame to allow scanning of the rest of the room. This ability to mount the laser instrument on the inside or the outside of the door frame is an important feature of the invention.

Figure 3:
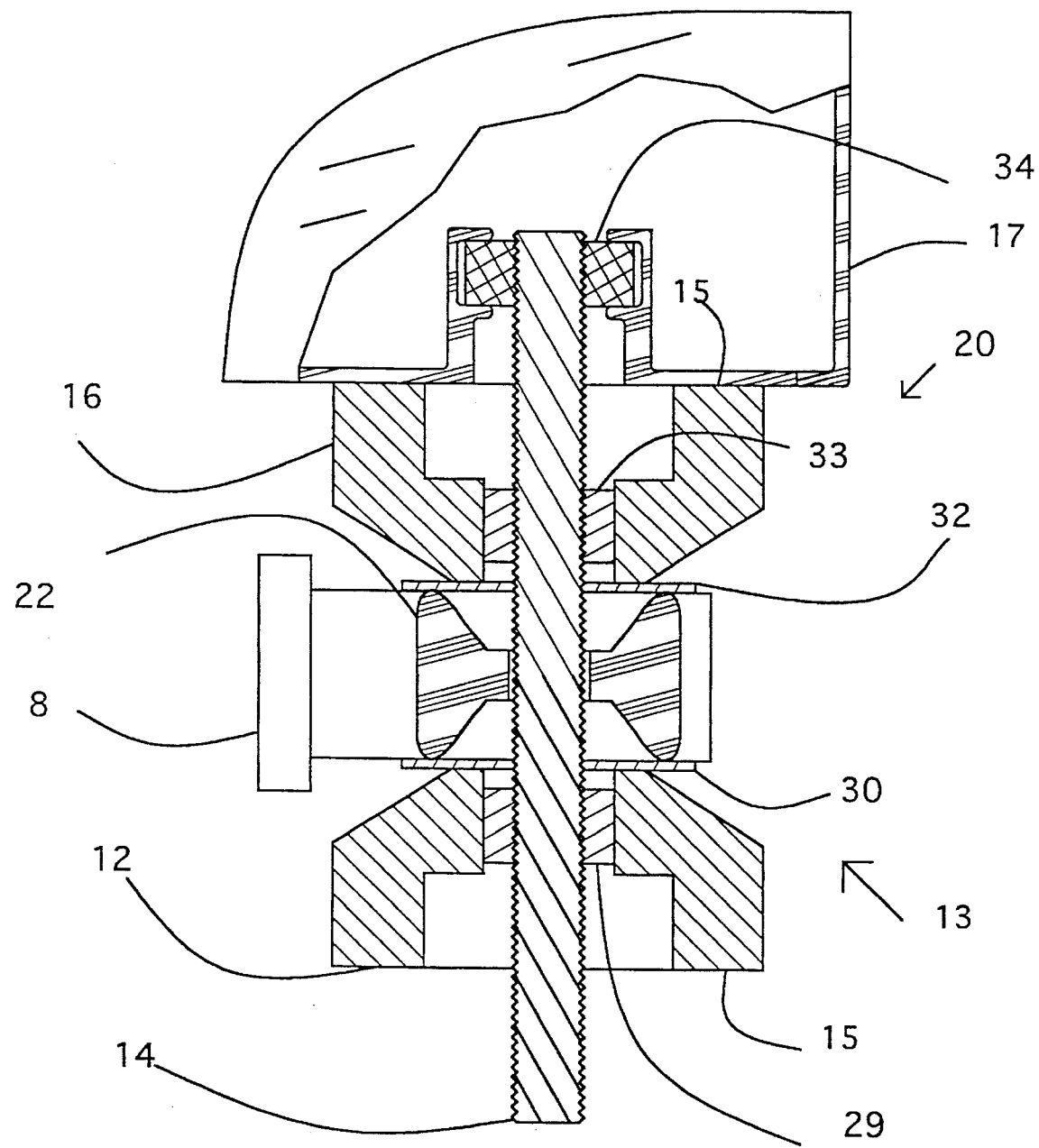
FIG. 3 is a section drawing through one jaw of the clamp device, showing detailed construction of the turntable assembly, with two opposed turntables, one of which holds a laser instrument.

FIG. 3 shows the clamp device in a section view taken at the turntable assembly 13, with a cutaway drawing of the laser instrument to show the fastening detail. Part numbers correspond to those in the previous figures. 22 represents the frame of the clamp jaw 5 which has a hole through it to allow the threaded rod 14 to connect the two turntables 12 and 16. These turntables have threaded brass inserts 29 and 33 respectively. Washers 30 and 32 provide a smooth bearing surface for mating to the plastic of the turntable. To further ensure the smooth motion of the turntables, the distance between the turntables is adjusted using the thread adjustment via the threaded liners 29 and 33. The final position of the threaded rod in the liners 29 and 33 is locked in place using a thread-locking adhesive such as that manufactured by the Loctite Corporation. The adhesive takes several minutes to harden. This time allows the fit to be adjusted at the time the turntables are fastened to the frame.

A portion of a laser instrument 17 is also shown in FIG. 3. The housing is indicated cut away to show a threaded steel nut 34 which is captured within the instrument.

Figure 4:
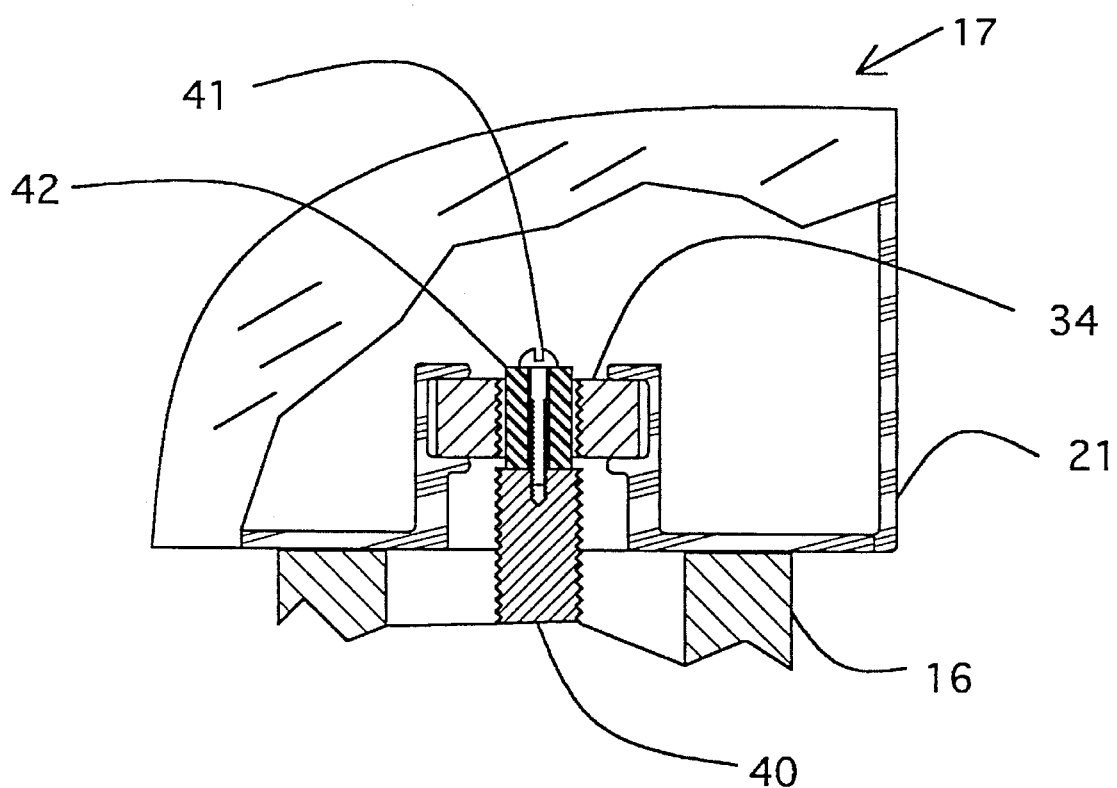
FIG. 4 is a sectional view showing a magnetic attachment to the turntable for retaining a laser instrument.

A quick-disconnect feature is shown in FIG. 4 as an alternative laser tool engagement. A threaded rod 40 (or a non-threaded rod) replaces the threaded rod 14 of FIG. 3. A magnet 42 is held in place by a small screw 41. The threaded steel insert 34 of the laser tool is fastened in the housing 21 of the laser tool 17 and holds the laser instrument to the turntable 16 via magnetic attraction rather than threads. To improve the holding strength of the magnet, it is poled in the direction of a diameter instead of along the axis of the cylindrical magnet.

Figure 5:
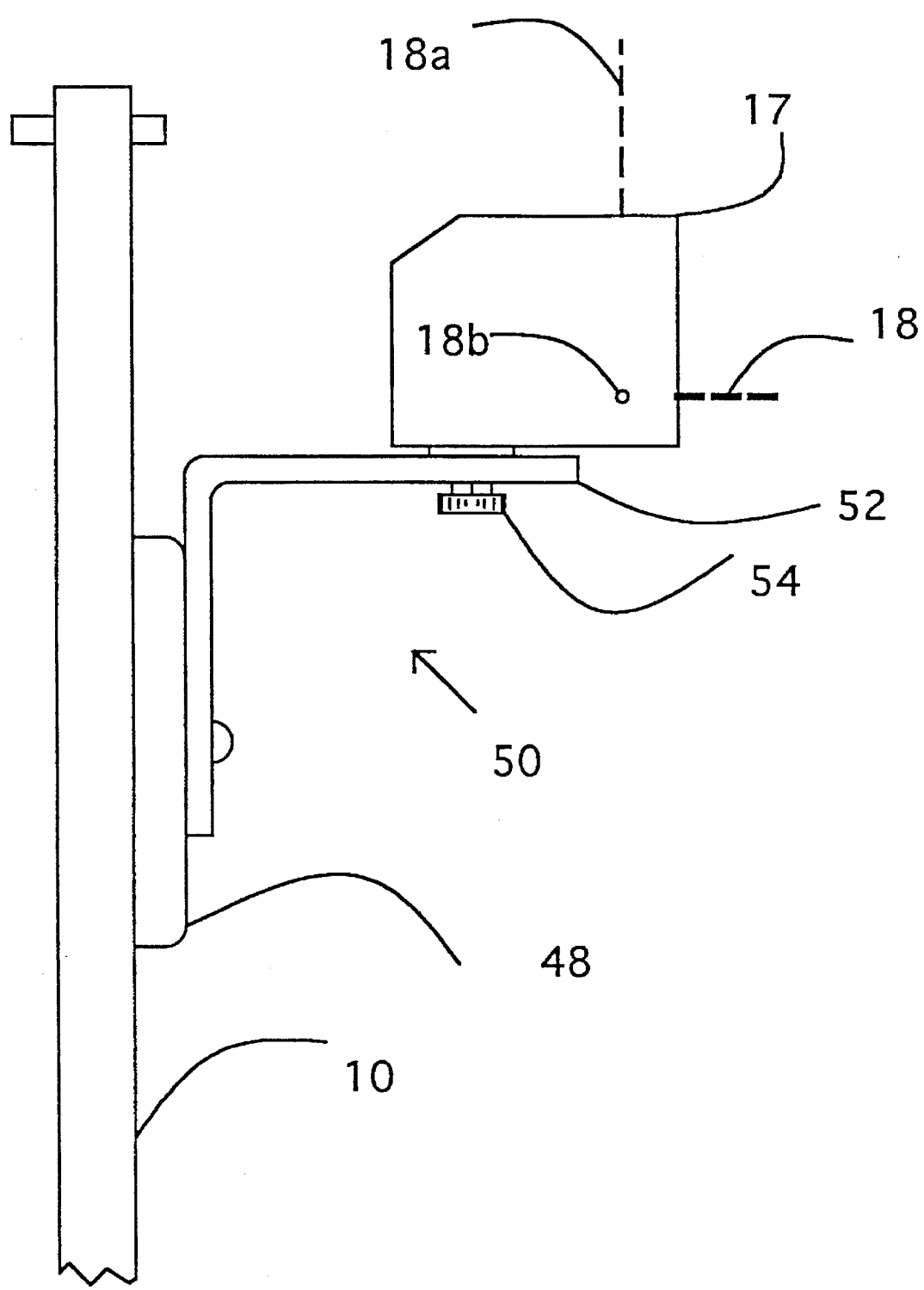
FIG. 5 is a schematic elevation view showing the slide bar of a mounting clamp which is engaged on a horizontal surface and a magnetic attachment held to the clamp's slide bar and providing a platform for the laser instrument.

FIG. 5 shows an alternative arrangement for mounting a laser instrument 17 using a quick grip clamp whose slide bar 10 is seen in FIG. 5. The clamp may be identical to what is shown in FIGS. 1 through 3, but it can be simply an off-the-shelf quick grip clamp such as shown in the above referenced U.S. Pat. Nos. 5,022,137 and 4,926,722, including the steel bar 10 which is used for the mounting arrangement in FIG. 5. In this laser mounting procedure, the quick grip clamp is secured to a horizontal surface such as a table top (not shown). The steel bar 10 of the clamp extends either downwardly or upwardly (as shown), providing a flat surface, facing to the right in FIG. 5, onto which a magnet 48 may conveniently be placed. The magnet 48 forms a part of an L-shaped mounting bracket 50 of the invention, and permits very convenient attachment of the mounting bracket, with easy adjustment of the height of the bracket, by movement on the slide bar 10.

As shown, the bracket 50 provides a platform 52 for the laser instrument 17. The platform preferably, but not necessarily, includes a machine screw mount with a tightening knob 54 for engagement of the laser tool via a threaded opening such as through the steel insert 34 as shown in FIG. 3. Other arrangements, such as magnetic retention, can be used in lieu of the screw thread; alternatively, a simple flat and wider platform can be provided at 52 for resting the tool 17 on the platform without positive securement.

FIG. 5 shows that the laser instrument 17, preferably a self-leveling laser instrument as described in copending application Ser. No. 248,517 (incorporated herein by reference), can project a plumb laser beam 18a as well as the horizontal beam 18. The apparatus of the invention described herein can be useful for operators desiring to utilize the plumb beam 18a, alone or in conjunction with the level beam 18. For purpose of lateral adjustment, the tightening knob 54 and screw thread arrangement therewith can be fitted through a slotted hole in the platform 52. Also, the quick action clamp (not shown in FIG. 5) can be moved laterally to the position desired. As also noted in FIG. 5, the laser instrument 17 can be one which also projects a third essentially intersecting beam, comprising a second horizontal beam 18b. This is useful for layout tasks wherein the laser instrument is located at one point and two lines at right angles are to be located by use of the horizontal beams 18a and 18b.

A further use of the quick action bar clamp of the invention, used alone or in conjunction with the L-shaped mounting bracket 50 of FIG. 5, is in providing stable mounting for a distance measuring laser instrument. Many such instruments require precise pointing, and a stable platform can be provided using the apparatus of the invention.

It should be understood that mounting platforms and retention devices can be located at other positions on either of the jaws of the clamp tool. For example, threaded rods and platforms or turntables could be at right angles to the threaded rod 14 in FIG. 1 and secured to the fixed jaw 5, oriented toward the left in FIG. 1 or at right angles to that position. These can be useful if the clamp tool cannot be oriented as in FIG. 1 or 2.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A quick action bar clamp with provision for mounting a laser instrument, comprising:

a pair of clamp jaws, including a fixed jaw and a movable jaw, the two jaws being in opposed positions and including opposed engaging surfaces positioned to engage and clamp onto structure between the jaws, a slide bar connecting the two jaws, the fixed jaw being fixedly mounted at one end of the slide bar, and including a pistol grip and one way drive means secured to the movable jaw and engaged with the slide bar at a spaced location from the fixed jaw, so as to enable pulling the two jaws toward one another when the pistol grip is squeezed to activate the one way drive means to advance the pistol grip and movable jaw along the slide bar, and mounting means on one of the two jaws, providing a mounting platform with means for stably receiving a laser instrument to rest on the mounting platform, and including attachment means for retaining the laser instrument on the platform.

2. The apparatus of claim 1, wherein the mounting means is on the fixed jaw.

3. The apparatus of claim 1, wherein the mounting means includes means for rotating the mounting platform with a laser instrument positioned on the platform.

4. The apparatus of claim 1, wherein the attachment means comprises a threaded rod positioned to cooperate with a threaded opening in the bottom of the laser instrument.

5. The apparatus of claim 4, wherein the mounting means includes two opposed rotating turntables on the threaded rod, facing in opposed directions and providing said mounting platform and a threaded rod end oriented in each of the two opposed directions.

6. The apparatus of claim 1, wherein the attachment means includes magnetic means for retaining the laser instrument on the mounting platform.

7. The apparatus of claim 6, wherein the attachment means includes a rod extending outwardly through the mounting platform, with the magnetic means being secured at the end of the rod and positioned to engage and attract metal structure of the laser instrument.

8. The apparatus of claim 1, in combination with a laser instrument having self-leveling means for projecting a laser beam in substantially level orientation within a self-leveling range of the instrument, the laser instrument being secured on said mounting means.

9. A method for supporting a self-leveling laser instrument, which projects a substantially level or plumb laser beam within a self-leveling range of the instrument, comprising:

providing a quick action type bar clamp having a pistol grip and movable jaw at one end, and a slide bar engaged with the pistol grip for sliding movement therewith, and with a fixed jaw secured to an end of the slide bar so that the two jaws form opposed clamping engagement surfaces movable toward one another by squeezing of the pistol grip, providing a mounting means on one of the two jaws, with a mounting platform having means for stably receiving a laser instrument to rest on the mounting platform, engaging the quick action type bar clamp onto a structure such that the mounting platform is approximately level, placing said self-leveling laser instrument on the mounting platform of the mounting means such that when the laser instrument is on the mounting platform the instrument is within its self-leveling range, and adjusting the height of the laser instrument as desired by adjusting the position of the quick action type bar clamp on said structure, and projecting a laser beam in substantially horizontal or plumb direction from the self-leveling laser instrument as secured to the quick action type bar clamp.

10. The method of claim 9, further including rotating the self-leveling laser instrument on the mounting platform while projecting a substantially level beam, so as to project an essentially level laser beam in different directions, through an essentially level plane.

11. A method for supporting a self-leveling laser instrument for projecting a laser beam, comprising:

providing a quick action type bar clamp having a pistol grip and movable jaw at one end, and a slide bar engaged with the pistol grip for sliding movement therewith, and with a fixed jaw secured to an end of the slide bar so that the two jaws form opposed clamping engagement surfaces movable toward one another by squeezing of the pistol grip, engaging the quick action type bar clamp onto a structure such that the slide bar extends outwardly from the pistol grip, providing a magnetic mounting bracket having a magnet at one end and a mounting platform for a laser instrument on another end, engaging the magnet of the mounting bracket against a flat side of the slide bar of the bar clamp, so as to position said other end of the mounting bracket to receive a self-leveling laser instrument such that the mounting platform is generally level for receiving the laser instrument, placing a self-leveling laser instrument, having a self-leveling range, on the mounting platform of the mounting bracket such that when the laser instrument is on the mounting bracket the instrument is within its self-leveling range, and adjusting the position of the laser instrument as desired by sliding the magnet on the bar of the clamp, and projecting a laser beam in substantially horizontal or plumb direction from the self-leveling laser instrument as secured to the quick action type bar clamp via the mounting bracket.

12. The method of claim 11, further including rotating the self-leveling laser instrument on the mounting platform while projecting a substantially level beam so as to project an essentially level laser beam in different directions, through an essentially level plane.

* * * * *